United States Patent
Cook et al.

(10) Patent No.: US 8,590,838 B2
(45) Date of Patent: Nov. 26, 2013

(54) AIRCRAFT INTERIOR LAVATORY

(75) Inventors: Don Cook, Arlington, WA (US); Liberty Harrington, Seattle, WA (US); Philipp Steiner, Seattle, WA (US); Robert K. Brauer, Seattle, WA (US); Trevor Skelly, Mercer Island, WA (US)

(73) Assignee: BE Intellectual Property, Inc., Wellington, FL (US)

( * ) Notice: Subject to any disclaimer, the term of this patent is extended or adjusted under 35 U.S.C. 154(b) by 228 days.

(21) Appl. No.: 13/089,063

(22) Filed: Apr. 18, 2011

(65) Prior Publication Data

US 2011/0253835 A1 Oct. 20, 2011

Related U.S. Application Data

(60) Provisional application No. 61/326,198, filed on Apr. 20, 2010, provisional application No. 61/346,835, filed on May 20, 2010.

(51) Int. Cl.
*B64D 11/06* (2006.01)

(52) U.S. Cl.
USPC ........................................ 244/118.6; 114/116

(58) Field of Classification Search
USPC ............. 244/1 R, 118.5, 118.6, 129.1, 117 R; 114/116
See application file for complete search history.

(56) References Cited

U.S. PATENT DOCUMENTS

| | | | |
|---|---|---|---|
| 4,055,317 A | 10/1977 | Greiss | |
| 4,884,767 A * | 12/1989 | Shibata | 244/118.5 |
| 5,577,358 A * | 11/1996 | Franke | 52/238.1 |
| 6,079,669 A * | 6/2000 | Hanay et al. | 244/118.5 |
| 6,889,936 B1 * | 5/2005 | Pho et al. | 244/118.5 |
| 7,222,820 B2 | 5/2007 | Wentland et al. | |
| 7,284,287 B2 * | 10/2007 | Cooper et al. | 4/664 |
| 8,109,469 B2 * | 2/2012 | Breuer et al. | 244/118.5 |
| 8,162,258 B2 * | 4/2012 | Joannis et al. | 244/118.6 |
| 8,167,244 B2 * | 5/2012 | Johnson et al. | 244/118.5 |
| 2006/0192050 A1 * | 8/2006 | Cheung et al. | 244/118.6 |
| 2007/0241232 A1 * | 10/2007 | Thompson | 244/118.6 |
| 2007/0295863 A1 * | 12/2007 | Thompson | 244/118.6 |
| 2009/0050738 A1 | 2/2009 | Breuer | |
| 2009/0065642 A1 * | 3/2009 | Cheung et al. | 244/118.6 |
| 2009/0200422 A1 | 8/2009 | Johnson | |
| 2009/0255437 A1 | 10/2009 | Hachet | |

(Continued)

FOREIGN PATENT DOCUMENTS

| | | |
|---|---|---|
| WO | 2005014395 A1 | 2/2005 |
| WO | 2005080196 A1 | 9/2005 |

OTHER PUBLICATIONS

EPO, International Search Report and Written Opinion for PCT international Application No. PCT/US2011/033090 dated Sep. 15, 2011.

*Primary Examiner* — Benjamin P Lee
(74) *Attorney, Agent, or Firm* — Fulwider Patton LLP

(57) ABSTRACT

A lavatory for an aircraft cabin includes a wall having a forward wall portion disposed immediately aft of and substantially conforming to an exterior aft surface of an aircraft cabin structure, such as a passenger seat, that is substantially not flat in a vertical plane. The forward wall portion includes a forward projection over an aft portion of the adjacent passenger seat. The forward wall portion can define a secondary space in the interior lavatory space, which can provide an amenity stowage space, and can include design elements providing visual space.

38 Claims, 1 Drawing Sheet

(56) References Cited

U.S. PATENT DOCUMENTS

| | | | |
|---|---|---|---|
| 2011/0121134 A1* | 5/2011 | Schotte et al. | 244/118.5 |
| 2011/0139930 A1* | 6/2011 | Sutthoff et al. | 244/118.5 |
| 2012/0112505 A1* | 5/2012 | Breuer et al. | 297/217.1 |
| 2012/0273614 A1* | 11/2012 | Ehlers et al. | 244/118.5 |
| 2012/0325964 A1* | 12/2012 | Hawkins et al. | 244/118.6 |

* cited by examiner

AIRCRAFT INTERIOR LAVATORY

CROSS-REFERENCES TO RELATED APPLICATIONS

This application is based upon and claims priority from Provisional Application No. 61/326,198, filed Apr. 20, 2010, and Provisional Application No. 61/346,835, filed May 20, 2010, which are incorporated by reference in their entirety herein.

BACKGROUND OF THE INVENTION

The present invention relates generally to aircraft enclosures, and more particularly relates to an aircraft cabin enclosure, such as a lavatory, an aircraft closet, or an aircraft galley, for example, including an aircraft cabin structure having an aft portion with a substantially vertically extending exterior aft surface that is substantially not flat in a vertical plane.

Aircraft lavatories, closets and other full height enclosures commonly have forward walls that are flat in a vertical plane. Structures such as passenger seats installed forward of such aircraft lavatories, closets and similar full height enclosures often have shapes that are contoured in the vertical plane. The juxtaposition of these flat walled enclosures and contoured structures renders significant volumes unusable to both the function of the flat walled lavatory or enclosure and the function of the contoured seat or other structure. Additionally, due to the lack of a provision for structural load sharing, conventional aircraft lavatories require a gap between the lavatory enclosures and adjacent structures, resulting in a further inefficiency in the use of space.

Aircraft bulkheads, typically separating passenger cabin areas or classes of passenger service, are in common use, and typically have a contour permitting passengers seated behind the bulkhead to extend their feet modestly under the premium seats immediately forward of the bulkhead. These provide a comfort advantage to passengers seated behind the bulkhead, but provide no increased efficiency in the use of space, in that they do not enable the seats fore and aft of the bulkhead to be placed more closely together. Short, floor-mounted stowage boxes, typically no taller than the bottom cushion of a passenger seat, are often positioned between the flat wall of current lavatories or other enclosures and passenger seats. These provide no improvement to the utility or spatial efficiency of the lavatory or other enclosure. While they do provide some useful stowage for miscellaneous items, they do not provide sufficient additional stowage to provide more space for passenger seating.

It would be desirable to provide an aircraft lavatory or other enclosure that can reduce or eliminate the gaps and volumes of space previously required between lavatory enclosures and adjacent structures to allow an adjacent structure such as passenger seating installed forward of the lavatory or other enclosure to be installed further aft, providing more space forward of the lavatory or enclosure for passenger seating or other features than has been possible in the prior art. Alternatively, the present invention can provide a more spacious lavatory or other enclosure with no need to move adjacent seats or other structures forward.

It would also be desirable to provide an aircraft lavatory or other enclosure with a wall to bear loads from an adjacent passenger seating or other structure, permitting elimination of a required gap between the lavatory or other enclosure and the adjacent passenger seating or other structure, making more space available for other uses. In addition, enabling a lavatory or other enclosure to bear loads from an adjacent structure can reduce the combined weight of the lavatory or other enclosure and the adjacent structure.

It also would be desirable to provide an aircraft lavatory or other enclosure that can reduce or eliminate the gaps and volumes of space previously required between lavatory enclosures and adjacent structures, to allow the installation of an increased number of passenger seats, to increase the value of the aircraft. The present invention meets these and other needs.

SUMMARY OF THE INVENTION

Briefly, and in general terms, the present invention provides for an enclosure, such as a lavatory, an aircraft closet, or an aircraft galley, for example, for a cabin of an aircraft including a structure having an aft portion with a substantially vertically extending exterior aft surface that is substantially not flat in a vertical plane. The enclosure structure permits a combination of the enclosure with the structure in a manner that permits significant saving of space in the aircraft, which in turn permits more seats to be installed, or more space to be offered per seat, increasing the value of the aircraft.

Accordingly, in one presently preferred aspect, the present invention provides for an enclosure unit for a cabin of an aircraft including an aircraft cabin structure having an aft portion with an exterior aft surface that is substantially not flat in a vertical plane. The enclosure unit can be a lavatory, an aircraft closet, or an aircraft galley, for example. In one presently preferred aspect, the enclosure unit includes one or more walls that are taller than an adjacent aircraft cabin structure, the one or more walls defining an interior enclosure space and having a forward wall portion. The forward wall portion is configured to be disposed immediately aft of and adjacent to or abutting the exterior aft surface of the aircraft cabin structure, and the forward wall portion is shaped to substantially conform to the shape of the exterior aft surface of the aircraft cabin structure.

In another presently preferred aspect, the enclosure unit includes an enclosure stall unit, and the aircraft cabin structure is a passenger seat installed immediately forward of the enclosure stall unit. In another presently preferred aspect, the forward wall portion of the enclosure unit is configured to accept loads from the aircraft passenger seat. In another presently preferred aspect, the forward wall portion includes a forward projection configured to project over an aft portion of the adjacent passenger seat immediately forward of the enclosure stall unit.

In another presently preferred aspect, the enclosure is a lavatory, including a lavatory stall unit with one or more walls having a forward wall portion. The one or more walls define an interior lavatory space, and the forward wall portion is configured to be disposed immediately aft of and adjacent to or abutting an aircraft cabin structure having an exterior aft surface having a shape that is substantially not flat in a vertical plane. In a presently preferred aspect, the forward wall portion is shaped to substantially conform to the shape of the exterior aft surface of the aircraft cabin structure.

In another presently preferred aspect, the aircraft cabin structure is a passenger seat installed immediately forward of the lavatory stall unit, and the forward wall portion of the lavatory stall unit is configured to accept loads from the passenger seat. In another presently preferred aspect, the forward wall portion includes a forward projection configured to project over an aft portion of the adjacent passenger seat immediately forward of the lavatory stall unit. In another presently preferred aspect, the forward wall portion defines a secondary space in the interior lavatory space in an area forward of an aft-most portion of the forward wall portion. The secondary space can provide an amenity stowage space inside the lavatory stall unit in the area forward of an aft-most portion of the forward wall portion, and can include design elements providing visual space inside the lavatory in the area forward of an aft-most portion of the forward wall portion.

In another presently preferred aspect, the present invention provides for an assembly of an aircraft enclosure unit and an aircraft cabin structure for an aircraft cabin, the assembly in combination including an aircraft cabin structure having an exterior aft surface having a shape that is substantially not flat in a vertical plane, and an aircraft enclosure unit including at least one wall having a forward wall portion. The one or more walls define an interior enclosure space, the forward wall portion is disposed immediately aft of and adjacent to the aircraft cabin structure, and the forward wall portion is shaped to substantially conform to the shape of the exterior aft surface of the aircraft cabin structure. In another presently preferred aspect, the aircraft cabin structure is a passenger seat installed immediately forward of the aircraft enclosure unit. In another presently preferred aspect, the forward wall portion is configured to accept loads from the aircraft passenger seat. In another presently preferred aspect, the forward wall portion includes a forward projection configured to project over an aft portion of the adjacent passenger seat immediately forward of the aircraft enclosure unit.

In another presently preferred aspect, the aircraft enclosure unit is a lavatory stall, and the one or more walls define an interior lavatory space. In another presently preferred aspect, the forward wall portion defines a secondary space in the interior lavatory space in an area forward of an aft-most portion of the forward wall portion.

In another presently preferred aspect, the present invention provides for an assembly of an aircraft lavatory unit and an aircraft cabin structure for an aircraft cabin, in which the assembly in combination includes an aircraft cabin structure having an exterior aft surface having a shape that is substantially not flat in a vertical plane, and an aircraft lavatory stall unit including one or more walls having a forward wall portion. In another presently preferred aspect, the one or more walls define an interior lavatory space, the forward wall portion is disposed immediately aft of and adjacent to the aircraft cabin structure, and the forward wall portion is shaped to substantially conform to the shape of the exterior aft surface of the aircraft cabin structure. In another presently preferred aspect, the aircraft cabin structure is a passenger seat installed immediately forward of the aircraft lavatory stall unit, and wherein the forward wall portion of the aircraft lavatory stall unit is configured to accept loads from the passenger seat. In another presently preferred aspect, the forward wall portion includes a forward projection configured to project over an aft portion of the adjacent passenger seat immediately forward of the aircraft lavatory stall unit. In another presently preferred aspect, the forward wall portion defines a secondary space in the interior lavatory space in an area forward of an aft-most portion of the forward wall portion.

These and other aspects and advantages of the invention will become apparent from the following detailed description and the accompanying drawings, which illustrate by way of example the features of the invention.

DETAILED DESCRIPTION OF THE PREFERRED EMBODIMENTS

Figure 1:
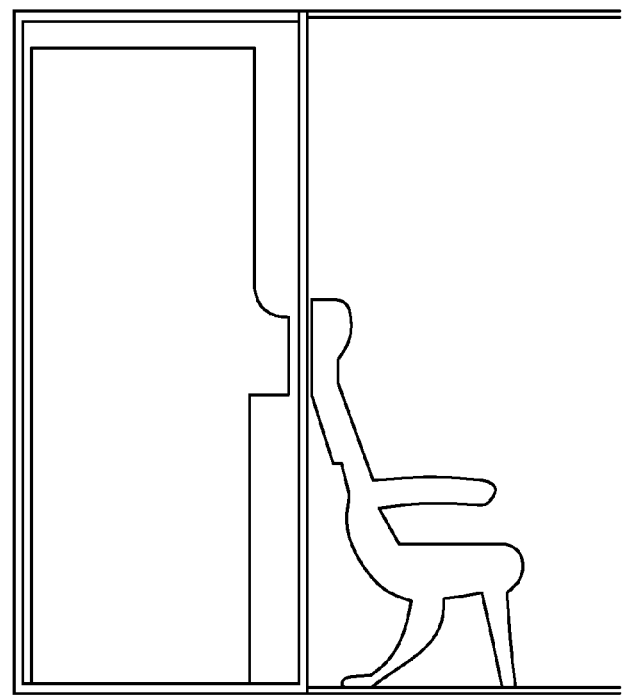
FIG. 1 is a schematic diagram of a prior art installation of a lavatory immediately aft of and adjacent to an aircraft passenger seat.
Figure 2:
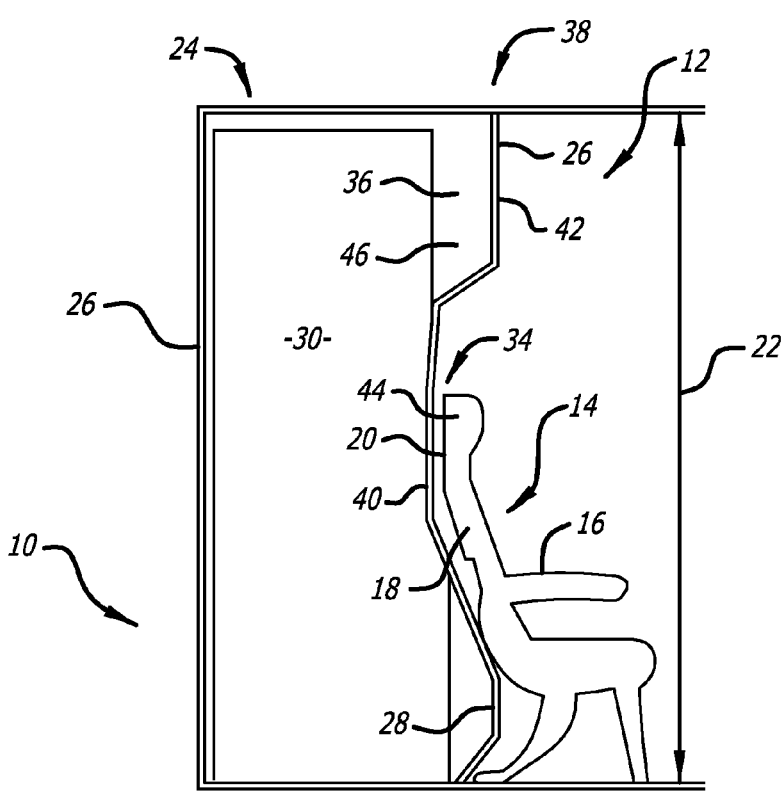
FIG. 2 is a schematic diagram of an installation of a lavatory according to the present invention immediately aft of and adjacent to or abutting an aircraft cabin passenger seat.

Referring to the drawings, which are provided by way of example, and not by way of limitation, the present invention provides for an enclosure 10, such as a lavatory for a cabin 12 of an aircraft (not shown), although the enclosure may also be an aircraft closet, or an aircraft galley, or similar enclosed or structurally defined spaces, for example. As is illustrated in FIG. 2, the cabin includes a structure 14, and the enclosure may be taller than the cabin structure. The cabin structure can be a passenger seat 16, for example, installed immediately forward of the enclosure and having an aft portion 18 with and exterior aft surface 20 that is substantially not flat in a vertical plane 22. The lavatory includes a lavatory stall unit 24 having one or more walls 26 having a forward wall portion 28. The one or more walls define an interior lavatory space 30, and the forward wall portion is configured to be disposed immediately aft of and adjacent to or abutting the exterior aft surface of the aircraft cabin structure. The forward wall portion has a shape that is substantially not flat in the vertical plane, and preferably is shaped to include a recess 34 such that the forward wall portion substantially conforms to the shape of the exterior aft surface of the aircraft cabin structure. In a presently preferred aspect, the forward wall portion of the lavatory stall unit is configured to accept loads from the passenger seat.

In another presently preferred aspect, the forward wall portion defines a secondary space 36 in the interior lavatory space in an area 38 forward of an aft-most portion 40 of the forward wall portion, and the forward wall portion includes a forward projection 42 configured to project over the aft portion of the adjacent passenger seat back 44 immediately forward of the lavatory stall unit. The secondary space can include an amenity stowage space 46 inside the lavatory stall unit in the area forward of the aft-most portion of the forward wall portion, and the secondary space can include design elements providing visual space, such as a visual perception of space, inside the lavatory in the area forward of an aft-most portion of the forward wall portion.

It will be apparent from the foregoing that while particular forms of the invention have been illustrated and described, various modifications can be made without departing from the spirit and scope of the invention. Accordingly, it is not intended that the invention be limited, except as by the appended claims.

We claim:

1. A lavatory for a cabin of an aircraft, the cabin including a passenger seat having an aft portion that is substantially not flat in a vertical plane, the lavatory comprising:
a lavatory stall unit having at least one wall having a forward wall portion, said at least one wall defining an interior lavatory space, and said forward wall portion being configured to be disposed immediately aft of and adjacent to an aircraft cabin passenger seat having an aft portion with an exterior aft surface having a shape that is substantially not flat in a vertical plane; and
wherein said forward wall portion is shaped to substantially conform to the shape of the exterior aft surface of the aft portion of the aircraft cabin passenger seat, and said forward wall portion includes an aft-extending recess in said forward wall portion configured to receive the aft portion of the aircraft cabin passenger seat therein.

2. The lavatory of claim 1, wherein the aircraft cabin passenger seat is installed immediately forward of said lavatory stall unit, and wherein the forward wall portion of the lavatory stall unit is configured to accept loads from the aircraft cabin passenger seat.

3. The lavatory of claim 1, wherein the aft portion of the aircraft cabin passenger seat comprises a seat back, and said forward wall portion includes a forward projection configured to project over an aft portion of the seat back of the aircraft cabin passenger seat immediately forward of the lavatory stall unit.

4. The lavatory of claim 3, wherein said forward wall portion defines a secondary space in said interior lavatory space in an area forward of an aft-most portion of the forward wall portion above the seat back of the aircraft cabin passenger seat.

5. The lavatory of claim 1, wherein said forward wall portion includes a lower portion that extends under the aft portion of the aircraft cabin passenger seat.

6. The lavatory of claim 1, wherein said aft-extending recess in said forward wall portion is disposed between a forward-extending upper wall portion and a forward-extending lower wall portion.

7. The lavatory of claim 1, wherein said aft-extending recess in said forward wall portion extends along substantially a full width of said forward wall portion.

8. The lavatory of claim 1, wherein said lavatory stall unit has a top, a bottom, a height therebetween, and a middle therebetween, said lavatory stall unit has varying lengths along the height of the lavatory stall unit, and said lavatory stall unit is longer at the top of the lavatory stall unit than at the bottom of the lavatory stall unit.

9. An aircraft enclosure for a cabin of an aircraft, the cabin including a passenger seat having an aft portion that is substantially not flat in a vertical plane, the aircraft enclosure comprising:
an enclosure unit that is taller than the passenger seat, said enclosure unit having at least one wall having a forward wall portion, said at least one wall defining an interior enclosure space, and said forward wall portion being configured to be disposed immediately aft of and adjacent to the passenger seat, said passenger seat having an aft portion with an exterior aft surface having a shape that is substantially not flat in a vertical plane; and
wherein said forward wall portion is shaped to substantially conform to the shape of the exterior aft surface of the aft portion of the passenger seat, and said forward wall portion includes an aft-extending recess in said forward wall portion configured to receive the aft portion of the passenger seat therein.

10. The aircraft enclosure of claim 9, wherein the passenger seat is installed immediately forward of said enclosure unit.

11. The aircraft enclosure of claim 9, wherein the forward wall portion of the enclosure unit is configured to accept loads from the passenger seat.

12. The aircraft enclosure of claim 9, wherein the aft portion of the passenger seat comprises a seat back, and said forward wall portion includes a forward projection configured to project over an aft portion of the seat back of the passenger seat immediately forward of the enclosure unit.

13. The aircraft enclosure of claim 12, wherein said forward wall portion defines a secondary space in said interior lavatory space above the seat back of the passenger seat in an area forward of an aft-most portion of the forward wall portion.

14. The aircraft enclosure of claim 9, wherein said enclosure unit comprises a lavatory stall, and said at least one wall defines an interior lavatory space.

15. The aircraft enclosure of claim 14, wherein the forward wall portion of the lavatory stall is configured to accept loads from the passenger seat.

16. The aircraft enclosure of claim 14, wherein said forward wall portion includes a forward projection configured to project over an aft portion of the passenger seat immediately forward of the lavatory stall.

17. The aircraft enclosure of claim 9, wherein said forward wall portion includes a lower portion that extends under the aft portion of the passenger seat.

18. The aircraft enclosure of claim 9, wherein said aft-extending recess in said forward wall portion is disposed between a forward-extending upper wall portion and a forward-extending lower wall portion.

19. The aircraft enclosure of claim 9, wherein said aft-extending recess in said forward wall portion extends along substantially a full width of said forward wall portion.

20. The aircraft enclosure of claim 9, wherein said enclosure unit has a top, a bottom, a height therebetween, and a middle therebetween, said enclosure unit has varying lengths along the height of the enclosure unit, and said enclosure unit is longer at the top of the enclosure unit than at the bottom of the enclosure unit.

21. An assembly of an aircraft enclosure unit and an aircraft cabin passenger seat for an aircraft cabin, the assembly in combination comprising:
an aircraft cabin passenger seat having an aft portion with an exterior aft surface having a shape that is substantially not flat in a vertical plane; and
an aircraft enclosure unit including at least one wall having a forward wall portion, said at least one wall defining an interior enclosure space, said forward wall portion being disposed immediately aft of and adjacent to said aircraft cabin passenger seat, said forward wall portion being shaped to substantially conform to the shape of the exterior aft surface of the aft portion of the aircraft cabin passenger seat, and said forward wall portion includes an aft-extending recess in said forward wall portion configured to receive the aft portion of the passenger seat therein.

22. The assembly of claim 21, wherein the aircraft cabin passenger seat is installed immediately forward of said aircraft enclosure unit.

23. The assembly of claim 22, wherein said forward wall portion is configured to accept loads from the aircraft cabin passenger seat.

24. The assembly of claim 22, wherein said forward wall portion includes a forward projection configured to project over the aft portion of the aircraft cabin passenger seat.

25. The assembly of claim 21, wherein said aircraft enclosure unit comprises a lavatory stall, and said at least one wall defines an interior lavatory space.

26. The assembly of claim 25, wherein said forward wall portion defines a secondary space in said interior lavatory space in an area forward of an aft-most portion of the forward wall portion.

27. The assembly of claim 21, wherein said forward wall portion includes a lower portion that extends under the aft portion of the aircraft cabin passenger seat.

28. The assembly of claim 21, wherein said aft-extending recess in said forward wall portion is disposed between a forward-extending upper wall portion and a forward-extending lower wall portion.

29. The assembly of claim 21, wherein said aft-extending recess in said forward wall portion extends along substantially a full width of said forward wall portion.

30. The assembly of claim 21, wherein said lavatory stall unit has a top, a bottom, a height therebetween, and a middle therebetween, said lavatory stall unit has varying lengths along the height of the lavatory stall unit, and said lavatory stall unit is longer at the top of the lavatory stall unit than at the bottom of the lavatory stall unit.

31. An assembly of an aircraft lavatory unit and an aircraft cabin passenger seat for an aircraft cabin, the assembly in combination comprising:

an aircraft cabin passenger seat having an aft portion with an exterior aft surface having a shape that is substantially not flat in a vertical plane; and an aircraft lavatory stall unit including at least one wall having a forward wall portion, said at least one wall defining an interior lavatory space, said forward wall portion being disposed immediately aft of and adjacent to said aircraft cabin passenger seat, and said forward wall portion being shaped to substantially conform to the shape of the exterior aft surface of the aft portion of the aircraft cabin passenger seat, and said forward wall portion includes an aft-extending recess in said forward wall portion configured to receive the aft portion of the passenger seat therein.

32. The assembly of claim 31, wherein the aircraft cabin a passenger seat is installed immediately forward of said aircraft lavatory stall unit, and wherein the forward wall portion of the aircraft lavatory stall unit is configured to accept loads from the aircraft cabin passenger seat.

33. The assembly of claim 32, wherein said forward wall portion includes a forward projection configured to project over the aft portion of the aircraft cabin passenger seat.

34. The assembly of claim 31, wherein said forward wall portion defines a secondary space in said interior lavatory space in an area forward of an aft-most portion of the forward wall portion.

35. The assembly of claim 31, wherein said forward wall portion includes a lower portion that extends under the aft portion of the passenger seat.

36. The assembly of claim 31, wherein said aft-extending recess in said forward wall portion is disposed between a forward-extending upper wall portion and a forward-extending lower wall portion.

37. The assembly of claim 31, wherein said aft-extending recess in said forward wall portion extends along substantially a full width of said forward wall portion.

38. The assembly of claim 31, wherein said enclosure unit has a top, a bottom, a height therebetween, and a middle therebetween, said enclosure unit has varying lengths along the height of the enclosure unit, and said enclosure unit is longer at the top of the enclosure unit than at the bottom of the enclosure unit.

\* \* \* \* \*